April 16, 1935. R. D. BROWN 1,998,044
KNIFE HANDLE
Filed Aug. 2, 1933
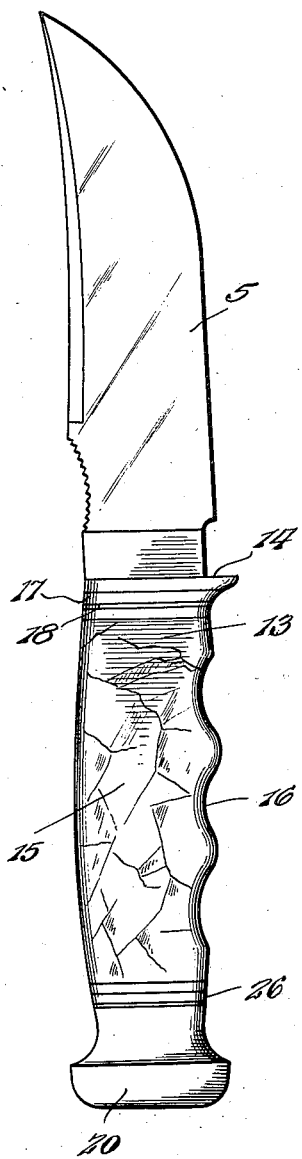
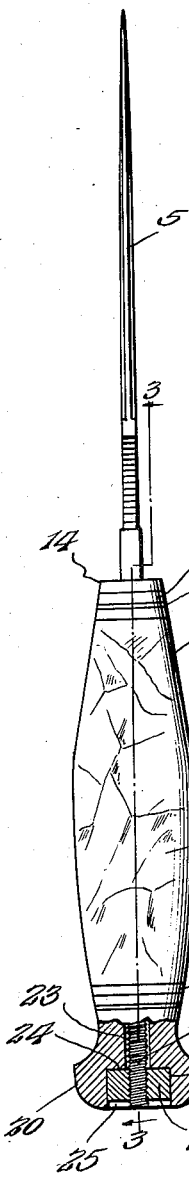
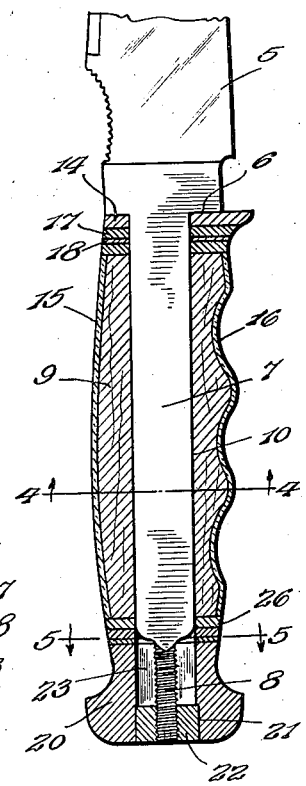
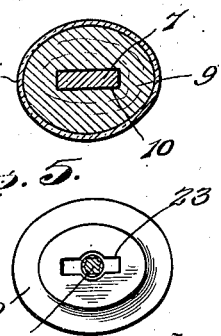
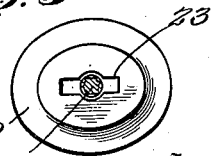
Inventor
R. D. Brown.
By Lacey & Lacey, Attorneys Patented Apr. 16, 1935

1,998,044

UNITED STATES PATENT OFFICE 1,998,044

KNIFE HANDLE

Richard D. Brown, Olean, N. Y.

Application August 2, 1933, Serial No. 683,388

4 Claims. (Cl. 30—9)

This invention relates to knife handles and more particularly to that class of knife handles shown and described in my co-pending application, Ser. No. 657,918, filed in the United States Patent Office, February 21, 1933, and of which the present application is a continuation in part.

The object of the invention is to provide a knife handle including a central core having notches or depressions formed in one side thereof which serve to receive and lock a plastic enveloping jacket or shell thereon, whereby the core and shell are firmly united and finger receiving depressions are provided in the handle to facilitate grasping the same when said handle is fitted to the shank of a hunting or other type of knife.

A further object of the invention is generally to improve this class of devices so as to increase their utility, durability and efficiency as well as to reduce the cost of manufacture.

In the accompanying drawing:

Figure 1 is a side elevation of a hunting knife provided with a handle constructed in accordance with the present invention.

Figure 2 is a front elevation, partly in section.

Figure 3 is a vertical sectional view taken on the line 3—3 of Figure 2, and looking in the direction of the arrows.

Figure 4 is a transverse sectional view taken on the line 4—4 of Figure 3.

Figure 5 is a similar view taken on the line 5—5 of Figure 3.

Similar numerals of reference indicate corresponding parts in all the figures of the drawing.

The improved handle forming the subject matter of the present invention is principally designed for use on hunting knives and by way of illustration is shown in connection with such a knife in which 5 designates the blade, the butt end of which is provided with oppositely disposed square shoulders 6 defining a reduced longitudinally extending shank 7, preferably flat and angular in cross section and having its outer end reduced to form a threaded extension 8. Slidably mounted on the shank 7 is a core 9 preferably formed of wood or other fibrous material and provided with a longitudinal bore 10 of a cross sectional diameter and shape to snugly receive the shank 7. The opposite side walls of the core 10 at one end thereof are preferably flattened and inclined at 13 so that said walls taper or merge into the abutment 14 of the knife and thus present a smooth inclined surface at the junction of the blade and handle, as best shown in Figure 2 of the drawing.

Surrounding the core 9 is an enveloping jacket 15 formed of celluloid or other plastic material, which jacket is constructed and shrunk on the core in the manner described in my co-pending application previously referred to. One longitudinal edge of the core 10 is formed with a series of notches or depressions 16 and these depressions not only form finger grips when the jacket is shrunk on the core but also serve to receive the plastic material constituting the shell or jacket and thus effectually lock the shell firmly in position on the core. When the plastic jacket is shrunk on the jacket the material of which the jacket is made will conform to the shape of and adhere to the exterior wall of the core while at the same time the plastic material is forced within the notches or depressions 16 so that said jacket will have an interlocking fit with the core and cause the parts to be firmly united. It will thus be seen that the notches or depressions 16 not only serve to prevent independent movement of the core with respect to the enveloping shell or jacket but also provide depressions for the reception of the fingers when grasping the knife and thus insure a firm grip on the handle at all times.

The abutment 14 bears against the shoulders 6 and interposed between the abutment and the adjacent end of the core 9 are a plurality of filler members or rings 17 preferably formed of fiber and between which is interposed a metallic ring 18. The core 9 is retained in position on the shank 7 by means of a cap piece 20 having a circular seat 21 formed therein and opening through the outer end thereof and adapted to receive a clamping nut 22 which latter engages the threads on the terminal 8 of the shank. The cap 20 is also preferably formed with a transverse slot 23 opening through the inner end thereof to accommodate the shank 7, said slot intersecting the circular seat 21 and forming oppositely disposed shoulders 24 against which the clamping nut 22 bears when said nut is clamped home. The nut 22 is formed with a slot or groove 25 adapted to receive a wrench or other suitable tool whereby the nut may be rotated to its seat and thus clamp the parts comprising the handle securely in assembled position on the shank. A plurality of filler members or rings 26 are preferably interposed between the cap 20 and the adjacent end of the core and these filler rings as well as the filler rings 17 may be made in contrasting colors so as to give the knife a neat finished appearance. The core 10 preferably tapers from its medial transverse axis in the direction of the opposite ends of the core so that one longitudinal edge of the handle will curve or bulge slightly outwardly to accommodate the palm of the hand while the other longitudinal edge of the core is formed with the depressions to receive the fingers of the hand, thereby insuring a good grip on the handle when the knife is in use.

The shell or jacket may be ornamented or embellished in any suitable manner to give it a mottled or other pleasing appearance. While the handle is shown and described in connection with a hunting knife, it will, of course, be understood that said handle may be used in connection with any desired type or style of knife without departing from the spirit of the invention.

Having thus described the invention, what I claim is:

1. A knife having a shank angular in cross section and provided with a reduced threaded portion, a longitudinally tapered core fitted over the shank and having a bore conforming to the shape of and adapted to snugly receive said shank, said core having one longitudinal edge thereof formed with depressions and its opposite longitudinal edge convex to accommodate the palm of the hand, an enveloping jacket of plastic material fitting over the core and conforming to the depressions, a cap piece fitting about the threaded portion of the shank against an end of the core, and a clamping nut engaging the threaded terminal of the shank and countersunk in the cap piece with its outer end substantially flush with the rear end face of the cap piece.

2. A knife having a reduced shank defining oppositely disposed shoulders and provided at one end with a reduced threaded terminal, a longitudinally tapered core snugly fitting the shank and having one longitudinal edge thereof provided with finger receiving depressions and its other longitudinal edge convex to accommodate the palm of the hand, an abutment plate engaging the shoulders, filler rings interposed between one end of the core and said abutment plate, a cap piece, filler rings interposed between the cap piece and the adjacent end of the core, an enveloping jacket surrounding the core and firmly adhering thereto, said cap piece being provided with a seat opening through the rear end thereof and communicating with a transverse slot opening through its front end and defining oppositely disposed abutment shoulders, and a clamping nut engaging the threaded terminal of the shank and entirely disposed within the seat and bearing against the abutment shoulders for securing the several parts in assembled relation.

3. A knife having a shank angular in cross section and provided with a reduced threaded portion, a longitudinally tapered core fitted over the shank and having a bore conforming to the shape of and snugly receiving the shank, an enveloping jacket of hardened plastic material fitting tightly about the core, a cap piece fitting about the threaded portion of the shank against an end of the core, and a clamping nut engaging the threaded portion of the shank and countersunk in the cap piece with its outer end flush with the rear end face of the cap piece.

4. A knife having a reduced shank defining oppositely disposed shoulders and provided at one end with a reduced threaded terminal, a longitudinally tapered core snugly fitting the shank, an enveloping jacket impervious to moisture surrounding the core and firmly adhering thereto and having a smooth glossy surface, an abutment plate engaging the shoulders, filler rings interposed between one end of the core and said abutment plate, a cap piece, filler rings interposed between the cap piece and the adjacent end of the core, said cap piece being provided with a seat opening through the rear end thereof and communicating with a transverse slot opening through its front end and defining oppositely disposed abutment shoulders, and a clamping nut engaging the threaded terminal of the shank and entirely disposed within the seat and bearing against the abutment shoulders for securing the several parts in assembled relation.

RICHARD D. BROWN. [L. S.]